United States Patent [19]

Tsai et al.

[11] Patent Number: 5,698,239
[45] Date of Patent: Dec. 16, 1997

[54] HEATING MECHANISM FOR ZIPPER FORMING MACHINES

[75] Inventors: Ray-Long Tsai; Joseph Wu, both of Taoyuan, Taiwan

[73] Assignee: Chung Shan Institute of Science & Technology, Lungstan, Taiwan

[21] Appl. No.: 646,743

[22] Filed: May 3, 1996

[51] Int. Cl.⁶ ........................................... B29D 5/04
[52] U.S. Cl. .................. 425/384; 264/210.5; 264/281; 264/339; 264/DIG. 40; 425/391; 425/393; 425/394; 425/403; 425/814
[58] Field of Search ........................ 425/384, 391, 425/393, 394, 407, 409, 814, 403; 264/210.5, 237.281, 285, 339, 168, DIG. 40

[56] References Cited

U.S. PATENT DOCUMENTS

| | | | |
|---|---|---|---|
| 2,974,372 | 3/1961 | Yoshida | 425/814 |
| 3,035,307 | 5/1962 | Yoshida | 425/814 |
| 3,132,380 | 5/1964 | Wilcken | 425/814 |
| 3,137,037 | 6/1964 | Wilcken | 425/391 |
| 3,262,157 | 7/1966 | Fujisaki | 425/391 |
| 3,353,217 | 11/1967 | Bashover | 425/391 |
| 3,917,787 | 11/1975 | Hansen | 425/814 |
| 4,325,184 | 4/1982 | Omori | 425/391 |
| 4,501,547 | 2/1985 | Mizuhara et al. | 425/391 |
| 5,164,142 | 11/1992 | Simmonds | 425/384 |

FOREIGN PATENT DOCUMENTS 45-28419   9/1970   Japan .................... 425/814

*Primary Examiner*—Jay H. Woo
*Assistant Examiner*—Joseph Leyson
*Attorney, Agent, or Firm*—Fish & Richardson P.C.

[57] ABSTRACT

A heating mechanism for zipper forming machines includes a mold base, a support seat, a seat cover, a screw sleeve and a heating element. The support seat has a clearance at a central portion and a heat insulation pad is fitted into the clearance for dividing the support seat into a heating area and a cooling area. The heating element is disposed in the heating area and a cooling element is disposed at the cooling area for enhancing heat energy efficiencies and reducing noise.

6 Claims, 3 Drawing Sheets

HEATING MECHANISM FOR ZIPPER FORMING MACHINES

BACKGROUND OF THE INVENTION

(a) Field of the Invention

The present invention relates to a zipper forming machine, and more particularly to an improved heating mechanism for zipper forming machines.

(b) Description of the Prior Art

Conventional zipper forming machines generally use cheap and inefficient electric thermal rods for heating purposes. Besides, the heat is transmitted indirectly via the mold to the forming screw, while cooling is achieved by blowing compressed air onto the nylon filaments to lower temperature. The prior art hence has the following drawbacks:

1. Use of electric thermal rods results in poor heating efficiency.
2. As heat is transferred indirectly via the mold to the forming screw, the entire mold will be heated so that some parts thereof may be damaged due to increased temperature, affecting the overall heat efficiency.
3. Blowing compressed air to cool nylon filaments may produce noise.

SUMMARY OF THE INVENTION

Accordingly, a primary object of the present invention is to provide an improved heating mechanism for zipper forming machines in which heat may be effectively dissipated.

Another object of the present invention is to provide an improved heating mechanism for zipper forming machines to improve the usage of heat source.

In an aspect of the present invention, a support seat is centrally provided with a clearance which can be fitted by a heat insulation pad for the purpose of dividing the support seat into a heating area and a cooling area. The cooling area has two through holes where a cooling pipe can go through to form a cooling path so that the circulating water can quickly remove the heat from the screw sleeve and the support seat. A heating coil is fitted onto the bottom round edge of the screw sleeve. Therefore, the heating coil can heat a forming screw disposed within the screw sleeve directly to achieve the valid usage of the heat source.

In another aspect of the invention, a heating coil of high wattage density is wound tightly around the screw sleeve so that the heat may directly reach the forming screw within and the nylon filaments. The working temperature of the heating coil maybe effectively reduced to save energy. The heat insulation pad disposed in the support seat for dividing the support seat into heating and cooling areas may reduce unnecessary waste of heat. The heat of the forming screw and the mold may be quickly removed by water circulating in a cooling flex so that the nylon filaments may be instantly cooled upon entry into the cooling area, eliminating use of blowing of compressed air.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
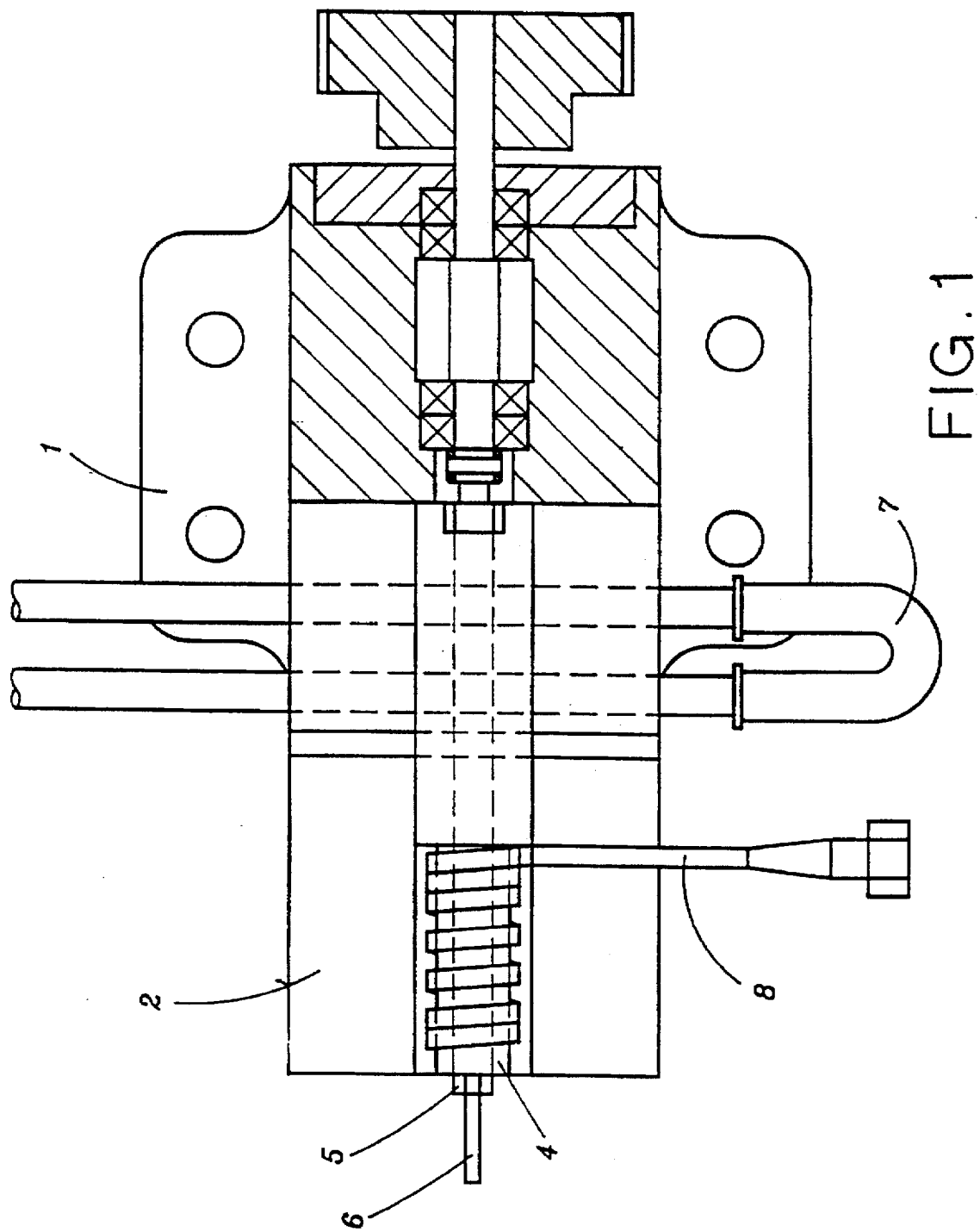
FIG. 1 is a schematic view of the present invention in an assembled state.
Figure 2:
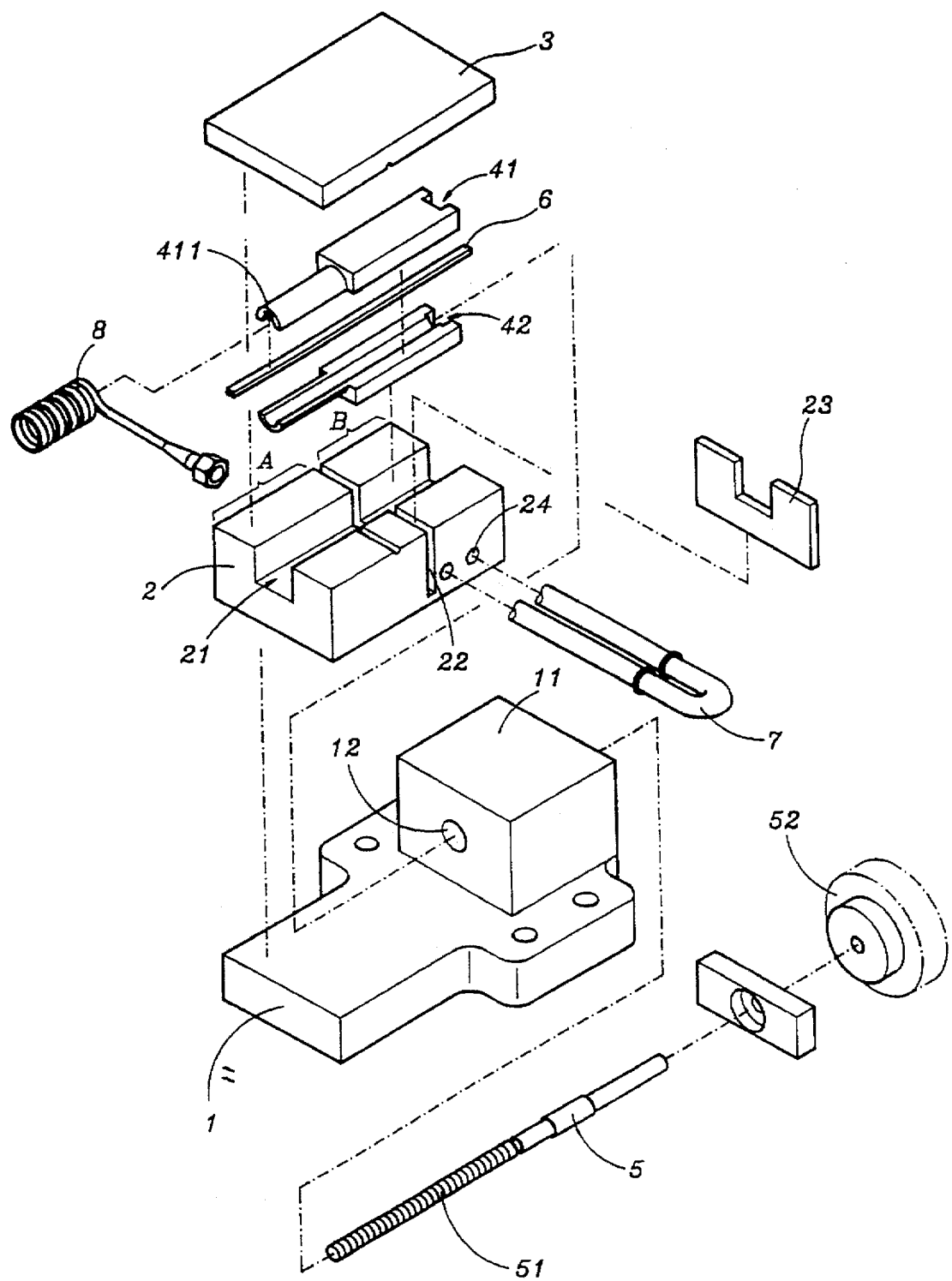
FIG. 2 is a schematic view of the present invention in an exploded state.

With reference to FIGS. 1 and 2, the heating mechanism for zipper forming machines of the invention essentially comprises a mold base 1, a support seat 2, a seat cover 3, a screw sleeve 4, a forming screw 5, a central rod 6, a cooling pipe 7 and a heating coil 8. The mold base 1 has one end provided with a block 11. The block 11 has a horizontal through hole 12 for securing and supporting the forming screw 5. The support seat 2 is disposed adjacent to the block 11 and has an axial, elongate slot 21 at an upper portion thereof. A clearance 22 is provided at a central portion thereof. A heat insulation pad 23 formed of ceramics with high heat-insulation property is fitted into the clearance 22 for dividing the support seat 2 into a heating area A and a cooling area B. The screw sleeve 4 consists of symmetrical upper and lower portions 41 and 42. As the inner walls thereof form hemispherical recesses, when the upper and lower portions 41, 42 of the screw sleeve 4 are coupled, a hollow is defined in the screw sleeve 4. A portion of the screw sleeve 4 is circular in shape. The heating coil 8 is fitted onto the circular portion of the screw sleeve 4. The cooling area B of the support seat 2 is provided with two through holes 24. By means of the cooling pipe 7, a cooling path is formed. The upper portion 41 of the screw sleeve 4 is provided with an elongate groove 411 in the inner wall thereof for accommodating the central rod 6. The forming screw 5 has one end with multiple threads 51 and the other end fixedly provided at a belt pulley 52 and passing through the through hole 12 of the block 11 of the mold base 1 so that the belt pulley 52 may bring the forming screw 5 to rotate.

Figure 3:
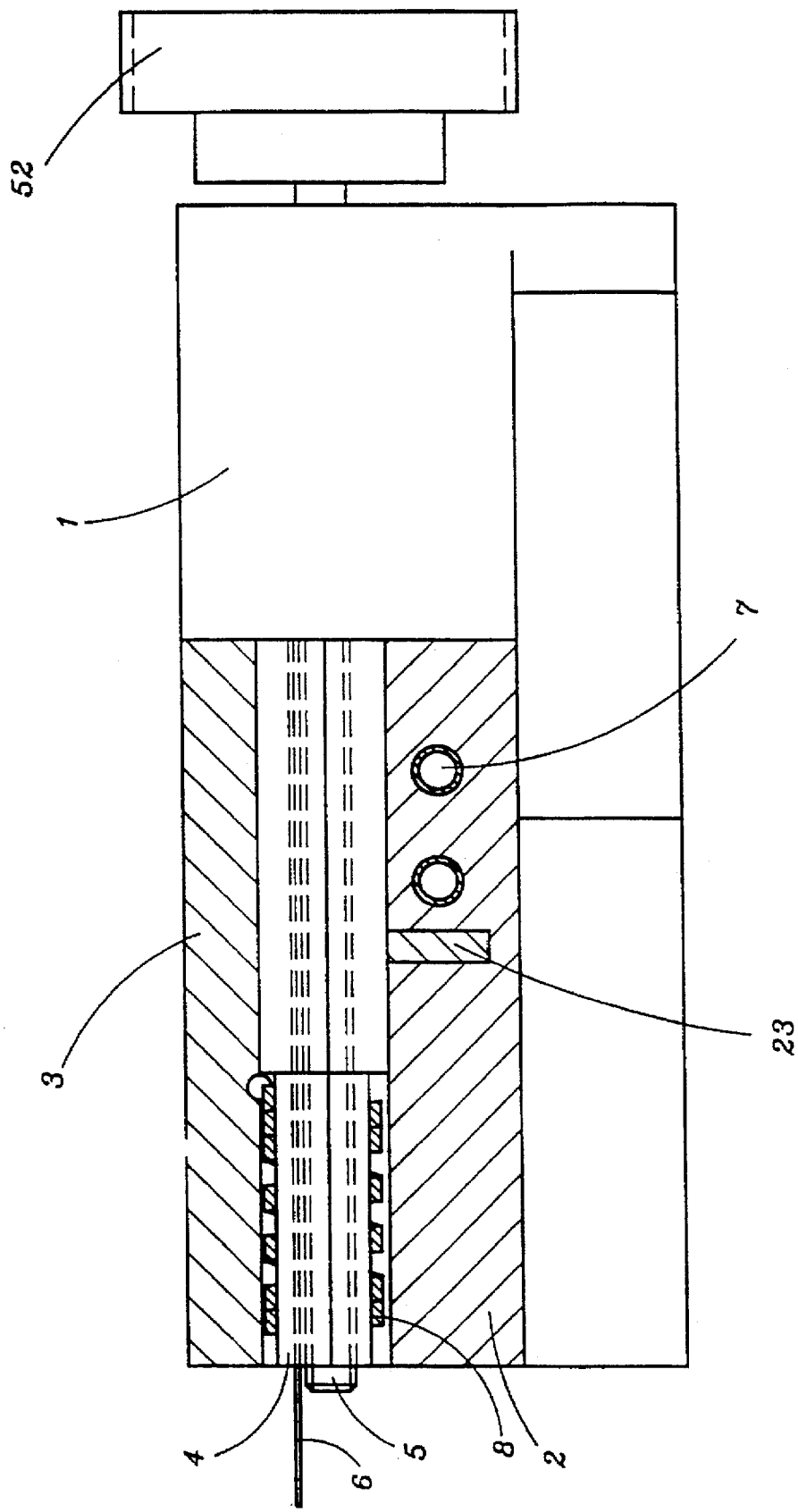
FIG. 3 is a schematic view of the present invention in section.

With reference to FIGS. 2 and 3, when power is transmitted by the belt pulley 52 to the forming screw 5, a nylon filament (not shown) follows the central rod 6 and the threads 51 of the forming screw 5 to curl upwardly. As when the nylon filament passes through the hollow at the circular portion of the screw sleeve 4, the heating coil 8 will heat the nylon filament to soften it, the heat insulation pad 23 will effectively insulate heat from the heating area A to extend to the cooling area B. Moreover, due to the circulation of cooling water in the cooling pipe 7 at the support seat 2, the heat of the screw sleeve 4 and the mold base 1 can be quickly dissipated so that when the nylon filament enters the cooling area B, it is instantly cooled.

Although the present invention has been illustrated and described with reference to the preferred embodiment thereof, it should be understood that it is in no way limited to the details of such embodiment but is capable of numerous modifications within the scope of the appended claims.

What is claimed is:

1. A zipper forming machine comprising:

a mold base;

a support seat disposed on said mold base and including a slot;

a seat cover for covering said seat;

a screw sleeve disposed in said slot and having an inner wall with an elongate groove formed along the length of the sleeve;

a central rod disposed within said elongate groove of said screw sleeve;

a forming screw disposed within said screw sleeve for molding a shape of a nylon filament inserted between said screw and said central rod; and a heating element, wherein said support seat has a clearance formed at a suitable position in a central portion thereof, a heat insulation pad being fitted into said clearance for dividing said support seat into a heating area and a cooling area, said heating element being disposed at said heating area, and a cooling element being disposed at said cooling area.

2. A zipper forming machine as claimed in claim 1, wherein said heating element is a heating coil.

3. A zipper forming machine as claimed in claim 1, wherein said screw sleeve includes an upper portion and a lower portion coupled together.

4. A zipper forming machine as claimed in claim 3, wherein the elongate groove for receiving the central rod is provided within said upper portion of said screw sleeve.

5. A zipper forming machine as claimed in claim 1, wherein said cooling element is a cooling pipe.

6. A zipper forming machine as claimed in claim 1, wherein the screw sleeve has an end proximal to the heating area for receiving the nylon filament.

* * * * *